(12) United States Patent
Fisher (10) Patent No.: US 11,628,892 B1
(45) Date of Patent: Apr. 18, 2023

(54) PICKUP TRUCK TAILGATE

(71) Applicant: Nathan Fisher, Deary, ID (US)

(72) Inventor: Nathan Fisher, Deary, ID (US)

( * ) Notice: Subject to any disclaimer, the term of this patent is extended or adjusted under 35 U.S.C. 154(b) by 0 days.

(21) Appl. No.: 17/487,540

(22) Filed: Sep. 28, 2021

(51) Int. Cl.
  *B62D 33/02* (2006.01)
  *B62D 33/027* (2006.01)
  *B60P 1/43* (2006.01)

(52) U.S. Cl.
  CPC .......... *B62D 33/0273* (2013.01); *B60P 1/435* (2013.01)

(58) Field of Classification Search
  CPC .. B62D 33/0273; B62D 33/037; B62D 33/03; B60P 1/435
  USPC ........................................................ 296/57.1
  See application file for complete search history.

(56) References Cited

U.S. PATENT DOCUMENTS

| | | | |
|---|---|---|---|
| 4,861,088 A | 8/1989 | Fedrigo | |
| 4,867,499 A | 9/1989 | Stephan et al. | |
| 5,340,184 A | 8/1994 | Conrado | |
| 5,788,311 A * | 8/1998 | Tibbals | B62D 33/0273 296/26.11 |
| D419,511 S | 1/2000 | Miller et al. | |
| D443,243 S | 6/2001 | Barela | |
| 6,676,182 B2 * | 1/2004 | Fitts | B60P 3/40 224/403 |
| 10,399,415 B2 | 9/2019 | Leterrier et al. | |
| 10,518,687 B2 * | 12/2019 | DeSimone | B60P 1/435 |
| 2008/0159838 A1 | 7/2008 | Sherer | |
| 2010/0181795 A1 * | 7/2010 | Papanikolaou | B62D 33/037 296/57.1 |

OTHER PUBLICATIONS

Pro Net High Performance Pro Flow Tailgate Net. Product Listing [online]. California Car Cover Co. [retrieved on Mar. 9, 2021]. Retrieved from the Internet: <URL: https://www.calcarcover.com/product/pro-net-high-performance-pro-flow-tailgate-net/1437>.
Go Industries Air Flow Mesh Tailgate 6636. Product Listing [online], © 2005-2021 autoaccessoriesgarage.com [retrieved on Mar. 9, 2021]. Retrieved from the Internet: <URL: https://www.autoaccessoriesgarage.com/Truck-Bed-Accessories/Go-Industries-Air-Flow-Mesh-Tailgate/_Item/_327600021>.

* cited by examiner

*Primary Examiner* — Joseph D. Pape
(74) *Attorney, Agent, or Firm* — Cramer Patent & Design, PLLC; Aaron R. Cramer (57) ABSTRACT

The pickup truck tailgate is a replacement tailgate for a pickup truck. The main body or field of the tailgate is made of a metal mesh which allows for smooth air flow through the bed of the truck. The tailgate is also provided with a removable inner section that slides outward. When the tailgate is in a down position, this section may be slide outward to allow for a longer bed area or raised upward when the tailgate is in the vertical position.

20 Claims, 9 Drawing Sheets

PICKUP TRUCK TAILGATE

RELATED APPLICATIONS

Figure 1:
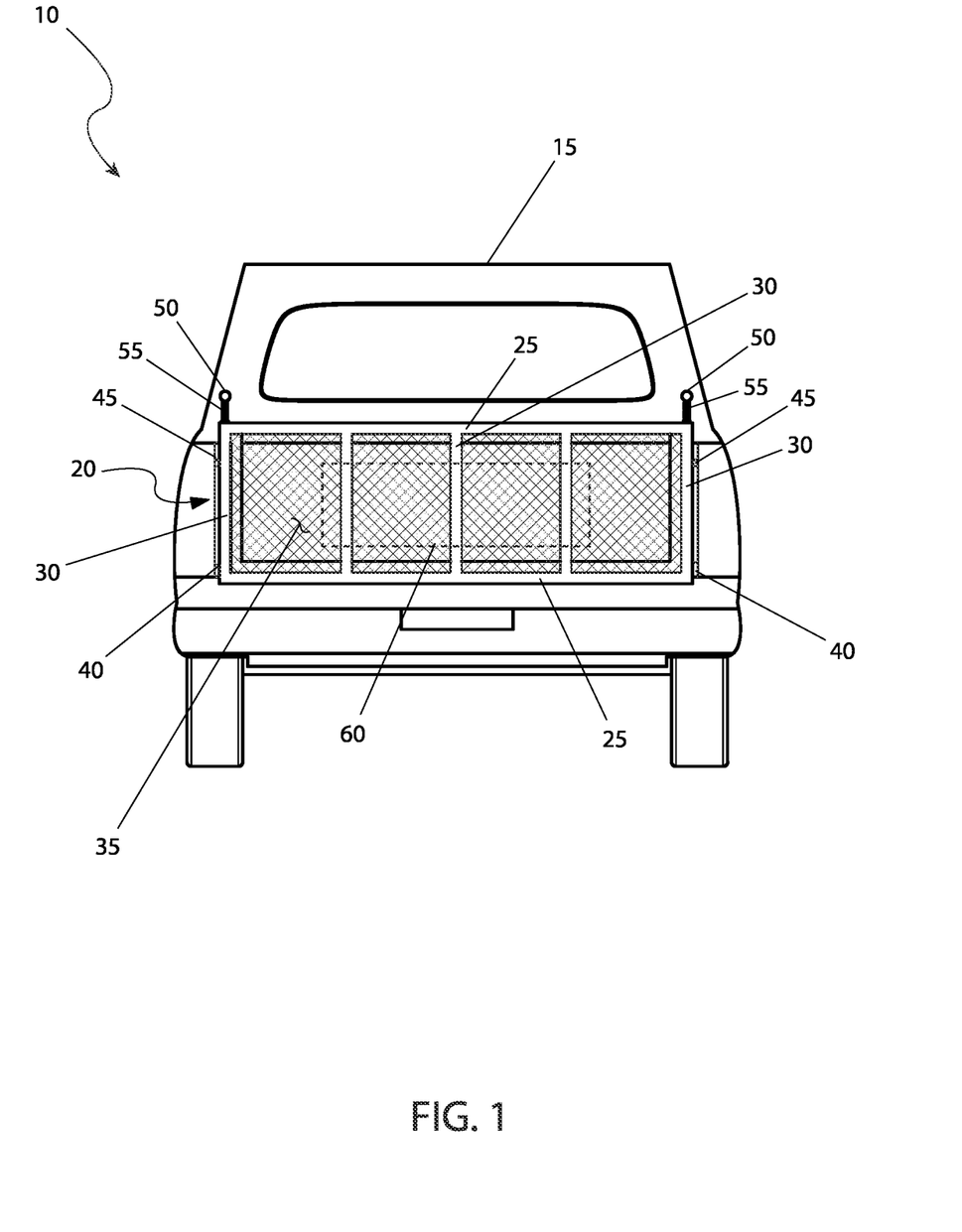
FIG. 1 is a perspective view of the pickup truck tailgate, shown in an installed and closed state, according to the preferred embodiment of the present invention.
Figure 2:
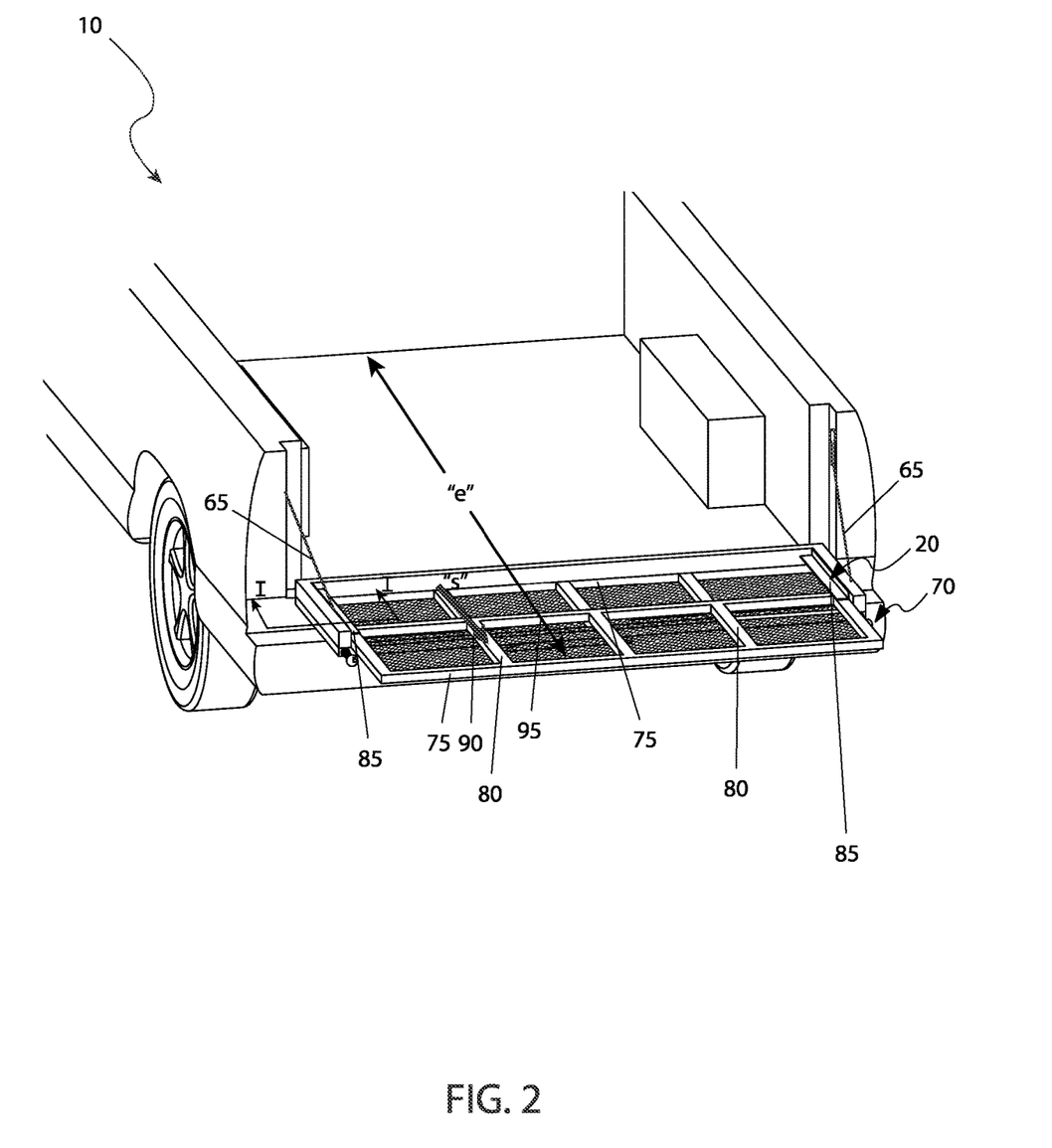
FIG. 2 is a perspective view of the pickup truck tailgate, shown in an open and extended state, according to the preferred embodiment of the present invention.
Figure 3:
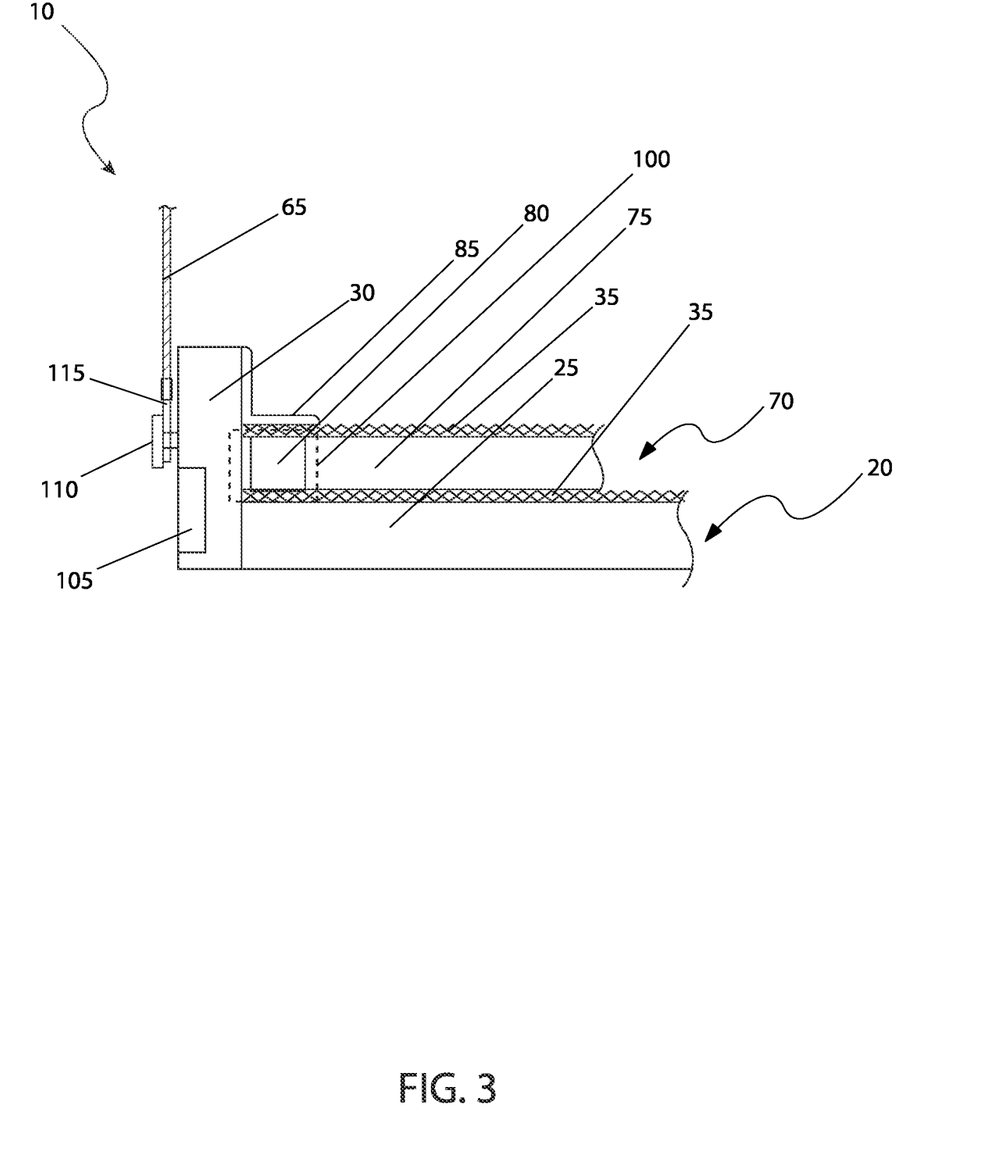
FIG. 3 is a sectional view of the pickup truck tailgate, as seen along a Line I-I, as shown in FIG. 2, according to the preferred embodiment of the present invention.

Referring now to FIG. 3, a sectional view of the tailgate 10, as seen along a Line I-I, as shown in FIG. 2, according to the preferred embodiment of the present invention is shown. The outer horizontal members 25 of the outer frame 20 are in physical communication with the outer vertical members 30, preferably by welding. Similarly, the track channels 85 are in physical communication with the outer vertical members 30. The inner horizontal members 75 and the inner vertical members 80 of the inner frame 70 are then free to move in a cavity 100 formed by the track channels 85 and the outer horizontal members 25. The grating 35 is permanently attached to both the outer frame 20 and the inner frame 70. A locking mechanism 105 is provided on the interior of the outer vertical members 30 and provides for the securement of the tailgate 10 to the locking pin clasps 45 (as shown in FIG. 1). Finally, the support cables 65 attaches to the outer vertical members 30 by use of a flanged pin 110 and a ring connector 115.

FIELD OF THE INVENTION

The present invention relates generally to a tailgate for a pickup truck and more specifically to a replacement tailgate for a pickup truck.

BACKGROUND OF THE INVENTION

With sales at an all-time high, the popularity of the pick-up style truck as an everyday vehicle is wider spread than it ever has been. Their utility and convenience in hauling items coupled with the availability of luxury interiors and extended cab space have made the pickup a popular alternative to other vehicles. However, no matter what size or length of bed one's pickup truck is, owners quickly wish for longer length beds when attempting to transport long load such as all-terrain vehicles (ATV's), motorcycles, snowmobiles, lumber, plywood, pipe and the like.

Even with the tailgate down, such loads will typically still be too long. Users are forced to then buy or rent a trailer, which ironically leaves the bed completely empty, thus negating the need for a pickup truck purchase in the first place. Accordingly, there exists a need for a means by which long or oversize loads can be carried in a pickup truck to address the shortcomings as described above. The development of pickup truck tailgate fulfills this need.

SUMMARY OF THE INVENTION

To achieve the above and other objectives, the present invention provides for a pickup truck tailgate has an outer frame which is positioned in an area adapted to be occupied by a conventional tailgate of a pick-up truck, an interior field which has a plurality of grating and an inner frame which has a pair of inner horizontal members and a plurality of inner vertical members.

The pickup truck tailgate also has a locking mechanism which is disposed on an interior of the outer vertical members. the locking mechanism secures the tailgate to the locking pin clasps and a gate release mechanism having a gate handle adapted to be operated by a user while opening of the outer frame, the gate handle is anchored between a moving end point pivot and indirectly to a fixed stanchion, that allows the gate handle to move. The outer frame is formed by a pair of outer horizontal members and a plurality of outer vertical members. The inner frame is positioned atop the outer frame and rides inside of a pair of track channels and moves along a sliding travel path.

The outer frame may be adapted to be attached to the pickup truck with a plurality of removable pin hinges in each lower corner of the outer frame and a plurality of locking pin clasps in each upper corner of the outer frame. The locking pin clasps may be opened on each side of the outer frame by a plurality of corresponding release knobs. Each of the corresponding release knobs may include a spring to allow for automatic locking when the tailgate is lifted up and closed. The outer frame pivots on the removable pin hinges, allowing the tailgate to be removed. The outer frame may be in an opened position is supported on a pair of support cables from each upper and outward corner of the outer frame. The support cables may attach to the outer vertical members by a flanged pin and a ring connector. The outer horizontal members of the outer frame may be in physical communication with the outer vertical members and the track channels are in physical communication with the outer vertical members. The grating may allow for a plurality of air flow through the tailgate when traveling at highway speeds resulting in higher gas mileage.

The inner frame may provide for an enhanced overall bed length for transportation of one or more items. The inner horizontal members and the inner vertical members of the inner frame may be free to move in a cavity formed by the track channels and the outer horizontal members.

The pickup truck tailgate may further comprise a pair of loading ramps are stored in the cavity of the outer frame in a horizontal manner. Each of the loading ramps include a pair of main members with a plurality of cross members, an attachment plate, and a hinge. The attachment plates may be positioned along the outer horizontal members of the outer frame while the hinge adjusts for a plurality of grades and a plurality of grade angles the pickup truck is parked upon. The pickup truck tailgate may further comprise a toolbox which is adapted to be installed on the tailgate installed in place of the inner frame. The toolbox may transition from a horizontal position when the outer frame is in a lowered or opened state to a vertical position when the outer frame is in a raised or closed state. An interior of the toolbox may include a plurality of tie-down straps to aid in securing a plurality of tools and supplies. Once moved, the fixed stanchion may operate a release pin that secures the outer frame to the pickup truck.

The release pin may be in a down position. The outer frame may be secured in upright vertical position and the release pin is in an up position, the outer frame is placed in an open horizontal position. The gate handle may be mechanically coupled to a pivot arm by a pivot connecting that connect the pivot arm to the fixed stanchion as well as the pivot arm to the release pin.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 pickup truck tailgate
15 pickup truck
20 outer frame
25 outer horizontal member
30 outer vertical member
35 grating
40 removable pin hinge
45 locking pin clasp
50 release knob
55 spring
60 logo area
65 support cable
70 inner frame
75 inner horizontal member
80 inner vertical member
85 track channel
90 sliding travel path "s"
95 overall bed length "e"
100 cavity
105 locking mechanism
110 flanged pin
115 ring connector
120 toolbox
125 lower half
130 upper half
135 rear hinge
140 clasp
145 flat work surface
150 ninety-degree (90°) angle
155 tie-down strap
160 loading ram
165 bed area
170 main members
175 cross members
180 attachment plate
185 hinge
190 grade
195 gate release mechanism
200 gate handle
205 moving end point pivot
210 fixed stanchion
215 release pin
220 pivot arm
225 pivot connection
230 reciprocation motion travel path "x"
235 spring

DESCRIPTION OF THE PREFERRED EMBODIMENTS

The best mode for carrying out the invention is presented in terms of its preferred embodiment, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the pickup truck tailgate 10, shown in an installed and closed state, according to the preferred embodiment of the present invention is disclosed. The pickup truck tailgate (herein also described as the "tailgate") 10, is installed on a pickup truck 15. Specific versions of the tailgate 10 would be required for each make and model of tailgate 10, with minor configuration differences for each version with regards to size, mounting configurations, and the like. However, the teachings of the tailgate 10, will apply to all versions. As such, the use of the tailgate 10 and any particular version of pickup truck 15 is not intended to be a limiting factor of the present invention. An outer frame 20 is provided in the area typically occupied by a conventional tailgate. The outer frame 20 is formed by two (2) outer horizontal members 25 and multiple outer vertical members 30, with the interior field comprised of grating 35. It is attached to the pickup truck 15 by use of removable pin hinges 40 in each lower corner and locking pin clasps 45 in each upper corner. The locking pin clasps 45 are opened on each side by corresponding release knobs 50 each with a spring 55 to allow for automatic locking when the tailgate 10 is lifted up and closed. The grating 35 is of an open nature allowing air flow through the tailgate 10 when traveling at highway speeds. The improved air flow will result in higher gas mileage when compared to a conventional tailgate. Finally, the outer frame 20 is provided with a logo area 60 allowing for placement of manufacturer's logos, marketing material, or other forms of personalization. The majority of the components of the tailgate 10 would be made of either steel or aluminum using well known metal cutting, finishing, and welding methods. After manufacture, a suitable protective finish such as paint or plating would be applied to prevent corrosion.

Referring next to FIG. 2, a perspective view of the tailgate 10, shown in an open and extended state, according to the preferred embodiment of the present invention is depicted. The outer frame 20 is lowered (opened) as typically expected with a conventional pickup truck tailgate. The outer frame 20 pivots on the removable pin hinges 40, allowing the tailgate 10 to be removed completely if so desired. The opened outer frame 20 is supported on two (2) support cables 65 from each upper and outward corner of the outer frame 20. An inner frame 70, comprised of two (2) inner horizontal members 75 and multiple inner vertical members 80 is positioned atop the outer frame 20 and rides inside of two (2) track channels 85 and thus moves along a sliding travel path "s" 90. It is deployed and extended position as shown, the inner frame 70 provides for an enhanced overall bed length "e" 95 extension. The overall bed length "e" 95 is viewed as desirable for transportation of long or oversized items such as lumber, piping, conduit, plywood, orientated strand board (OSB), drywall, power equipment, motorcycles, all terrain vehicles (ATV's), snowmobiles, golf carts, and the like. It is noted that the inner frame 70 may be removed if not needed for the enhancement of the overall bed length "e" 95 or if another option (to be described herein below) is to be installed on the outer frame 20.

Referring now to FIG. 3, a sectional view of the tailgate 10, as seen along a Line I-I, as shown in FIG. 2, according to the preferred embodiment of the present invention is shown. The outer horizontal members 25 of the outer frame 20 is in physical communication with the outer vertical members 30, preferably by welding. Similarly, the track channels 85 is in physical communication with the outer vertical members 30. The inner horizontal members 75 and the inner vertical members 80 of the inner frame 70 are then free to move in a cavity 100 formed by the track channels 85 and the outer horizontal members 25. The grating 35 is permanently attached to both the outer frame 20 and the inner frame 70. A locking mechanism 105 is provided on the interior of the outer vertical members 30 and provides for the securement of the tailgate 10 to the locking pin clasps 45 (as shown in FIG. 1). Finally, the support cables 65 attaches to the outer vertical members 30 by use of a flanged pin 110 and a ring connector 115.

Figure 4:
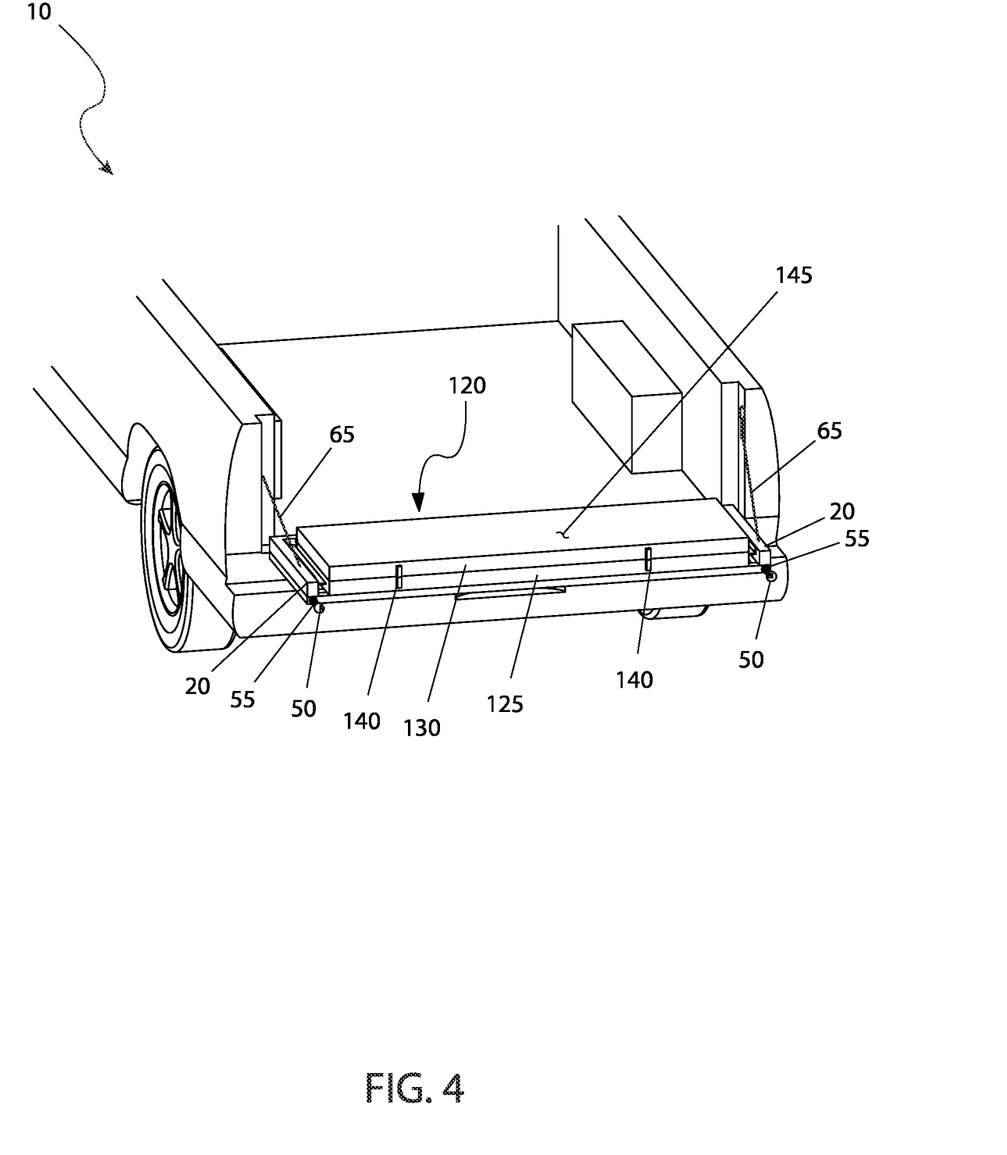
FIG. 4 is a perspective view of the pickup truck tailgate, with a toolbox installed and in a closed state, according to the preferred embodiment of the present invention.

Referring next to FIG. 4, a perspective view of the tailgate 10, with a toolbox 120 installed and in a closed state, according to the preferred embodiment of the present invention is disclosed. The toolbox 120 is installed in place of the inner frame 70 (as shown in FIG. 2). The toolbox 120 is comprised of a lower half 125 and an upper half 130 connected by a rear hinge 135 (not shown in this FIG. due to illustrative limitations). The lower half 125 and the toolbox 120 are secured in a closed state as shown via at least one (1) clasp 140 (two (2) are shown in FIG. 4). It is noted that the toolbox 120 transitions from a horizontal position when the outer frame 20 is in a lowered or opened state (as shown) to a vertical position when the outer frame 20 is in a raised or closed state (similarly to that shown in FIG. 1). The balance of the components used in the tailgate 10 such as the release knobs 50, the support cables 65, and the springs 55 remain the same. Additionally, the upper half 130 provides a durable flat work surface 145, similar to a workbench, when the toolbox 120 is in a closed state.

Figure 5:
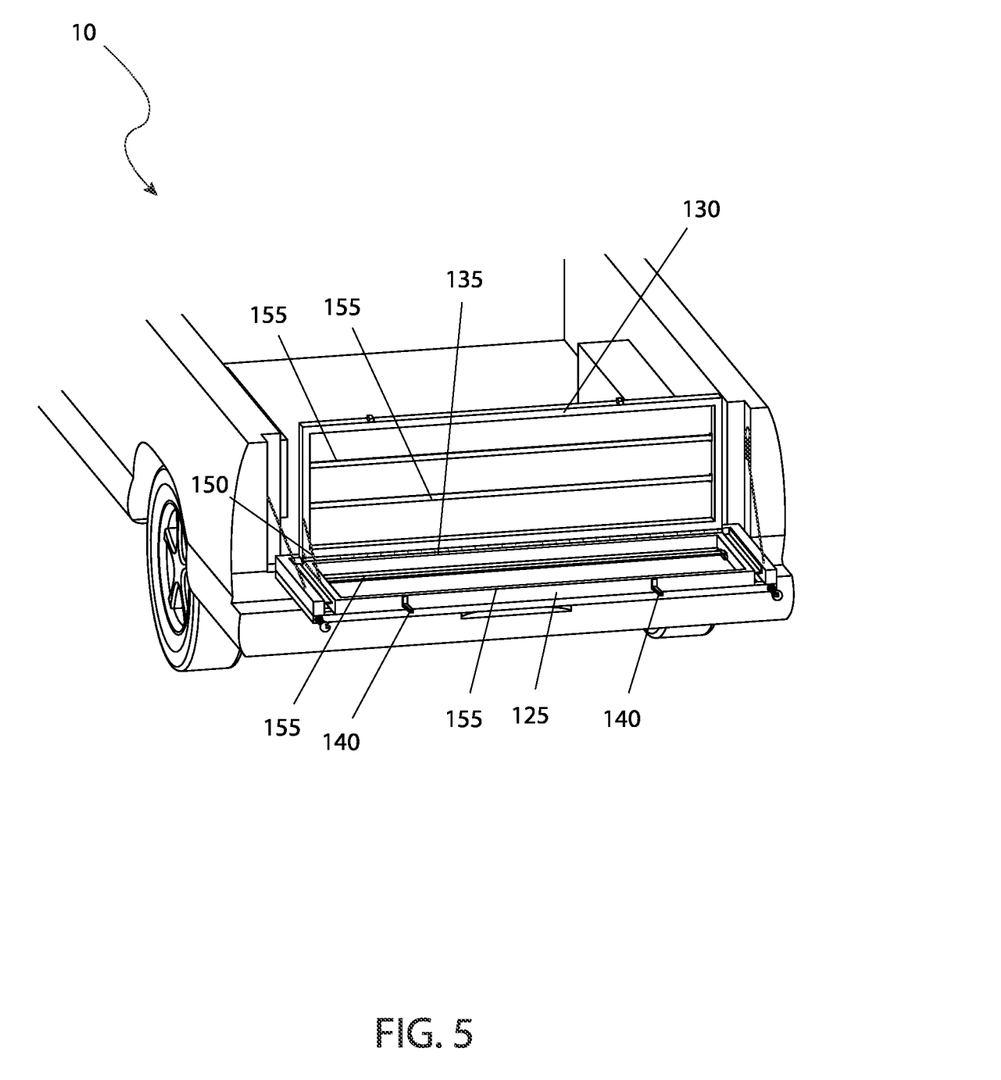
FIG. 5 is a perspective view of the pickup truck tailgate, with a toolbox installed and in an opened state, according to the preferred embodiment of the present invention.

Referring now to FIG. 5, a perspective view of the tailgate 10, with a toolbox 120 installed and in an opened state, according to the preferred embodiment of the present invention is depicted. The upper half 130 opens at a ninety-degree (90°) angle 150 to the lower half 125 thus exposing the rear hinge 135. The clasps 140 are shown in an unlatched and opened state. The interior of both the lower half 125 and the upper half 130 are provided with multiple tie-down straps 155 to aid in the securement of tools and supplies, as both the lower half 125 and the upper half 130 will transition from vertical to horizontal and back during a normal storage, usage and subsequent storage cycle.

Figure 6:
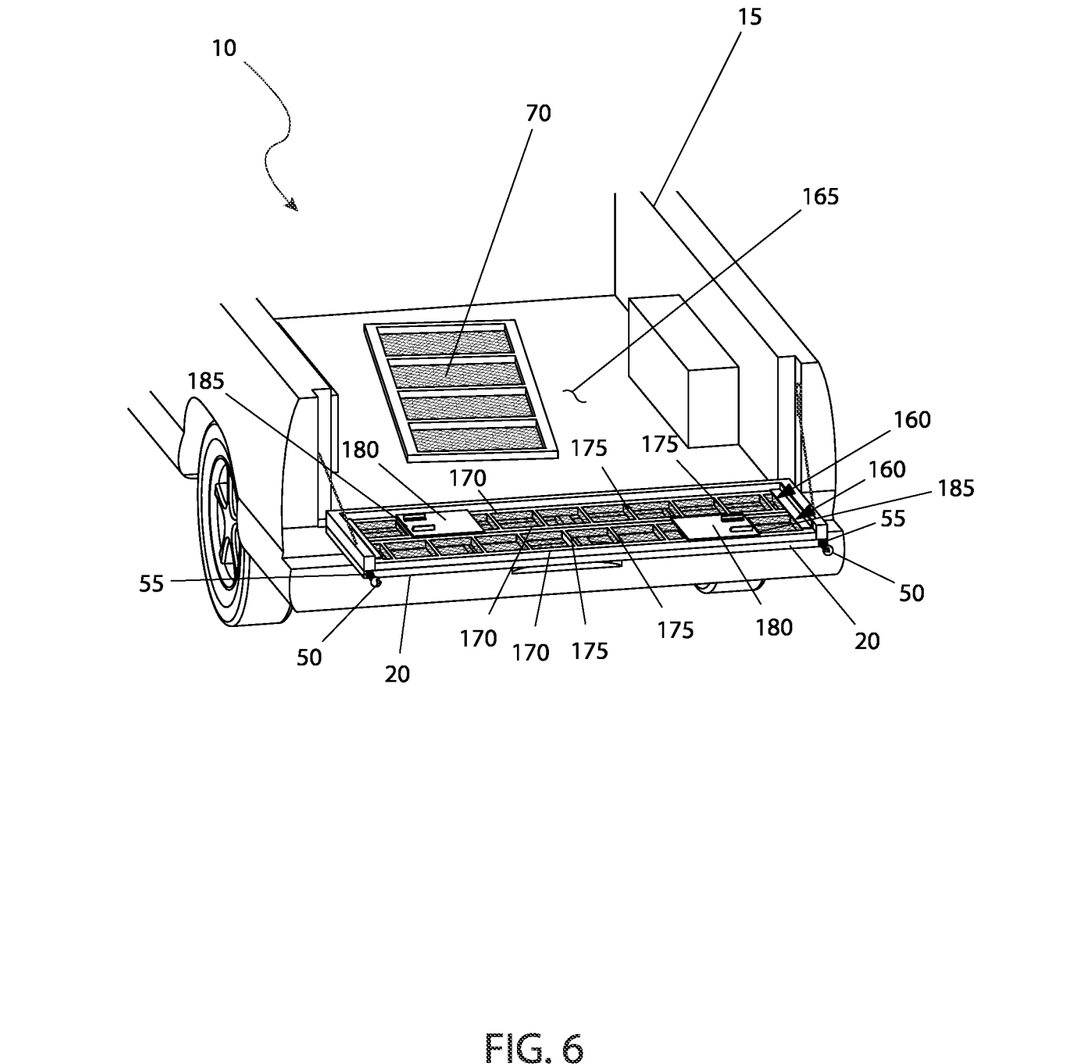
FIG. 6 is a perspective view of the pickup truck tailgate, with a loading ramp installed and in a stored state, according to the preferred embodiment of the present invention.

Referring next to FIG. 6, a perspective view of the tailgate 10, with a loading ramp 160 installed and in a stored state, according to the preferred embodiment of the present invention is shown. The inner frame 70 is removed from the outer frame 20 and stored in the bed area 165 of the pickup truck 15 for later use. The two (2) loading ramps 160 are stored in cavity 100 (as shown in FIG. 3) of the outer frame 20 in a horizontal manner. Each loading ramp 160 includes two (2) main members 170 along with multiple cross members 175. One (1) end of each loading ramp 160 is provided with an attachment plate 180 and a hinge 185. Further description of the attachment plate 180 and the hinge 185 will be provided herein below. The release knobs 50 along with each associated spring 55 remain part of the main outer frame 20 and function identically to that as aforementioned described.

Figure 7:
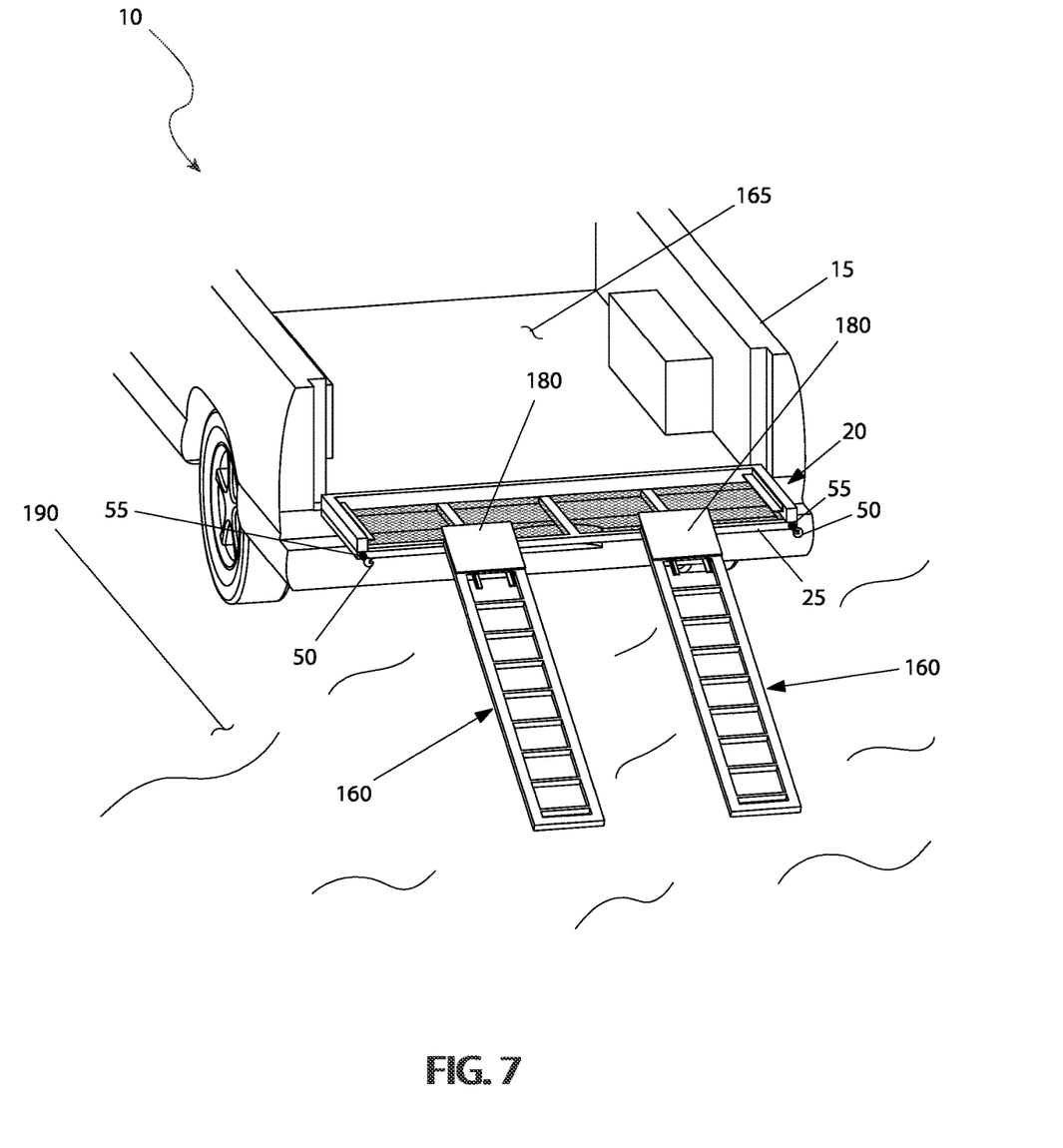
FIG. 7 is a perspective view of the pickup truck tailgate with interchangeable enhancements, with a loading ramp installed and in a deployed state, according to the preferred embodiment of the present invention.

Referring now to FIG. 7, a perspective view of the tailgate 10, with a loading ramp 160 installed and in a deployed state, according to the preferred embodiment of the present invention is disclosed. This figure depicts the two (2) loading ramps 160 in a removed state and at the edge of the outer frame 20, as would typically be experienced in a loading or unloading process. The attachment plates 180 are positioned along the outer horizontal members 25 of the outer frame 20 while the hinge 185 (as shown in FIG. 6) adjusts for various grade 190 and grade angles the pickup truck 15 may be parked upon. This position allows for loading of wheeled items such as motorcycles, ATV's, and the like. Such usage provides for storage of the loading ramps 160 without worry of storage within the bed area 165 of the pickup truck 15.

Figure 8:
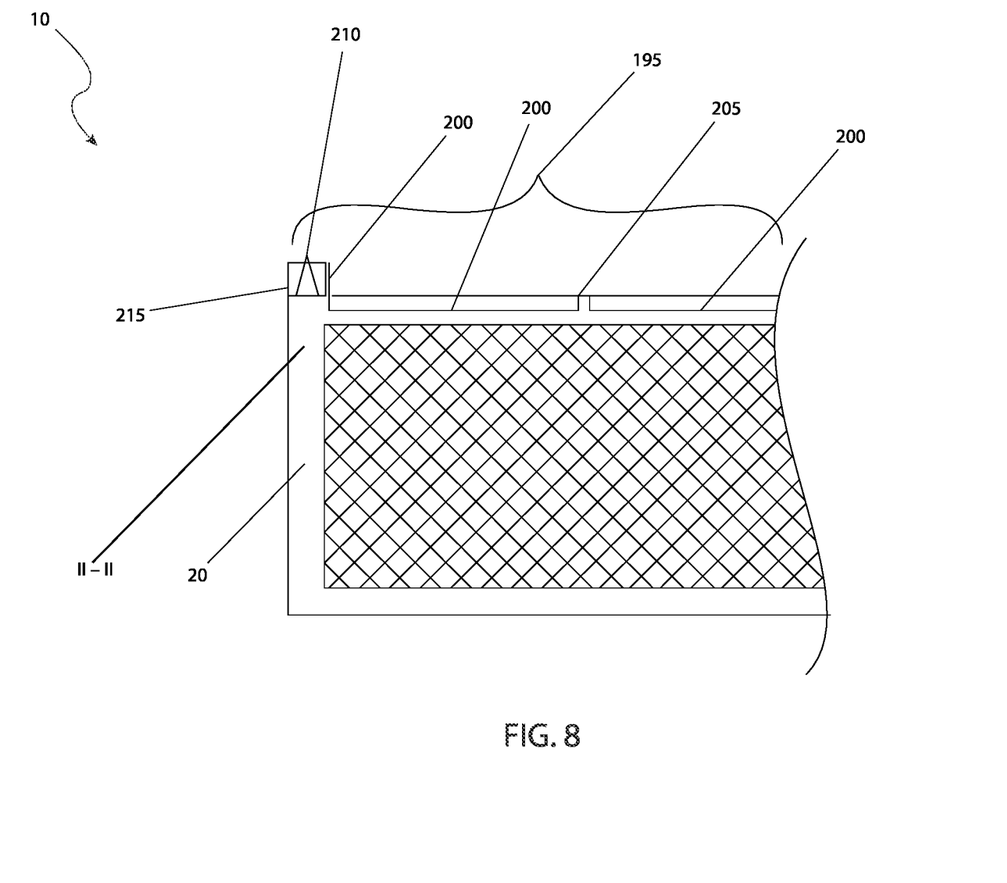
FIG. 8 is a partial rear view of the gate release mechanism as used with the tailgate, according to the preferred embodiment of the present invention.

Referring next to FIG. 8, a partial rear view of the gate release mechanism 195 as used with the tailgate 10, according to the preferred embodiment of the present invention is depicted. The gate release mechanism 195 consists of a gate handle 200 that is operated by a user during the opening of the outer frame 20. The gate handle 200 is anchored between a moving end point pivot 205 and indirectly to a fixed stanchion 210, that allows the gate handle 200 to move. Once moved, the fixed stanchion 210 operates a release pin 215 that secures the outer frame 20 to the pickup truck 15. When the release pin 215 is in a down position, the outer frame 20 is secured in upright vertical position. When the release pin 215 is in an up position, the outer frame 20 may be placed in an open horizontal position. Further description of the gate release mechanism 195 will be provided herein below.

Figure 9:
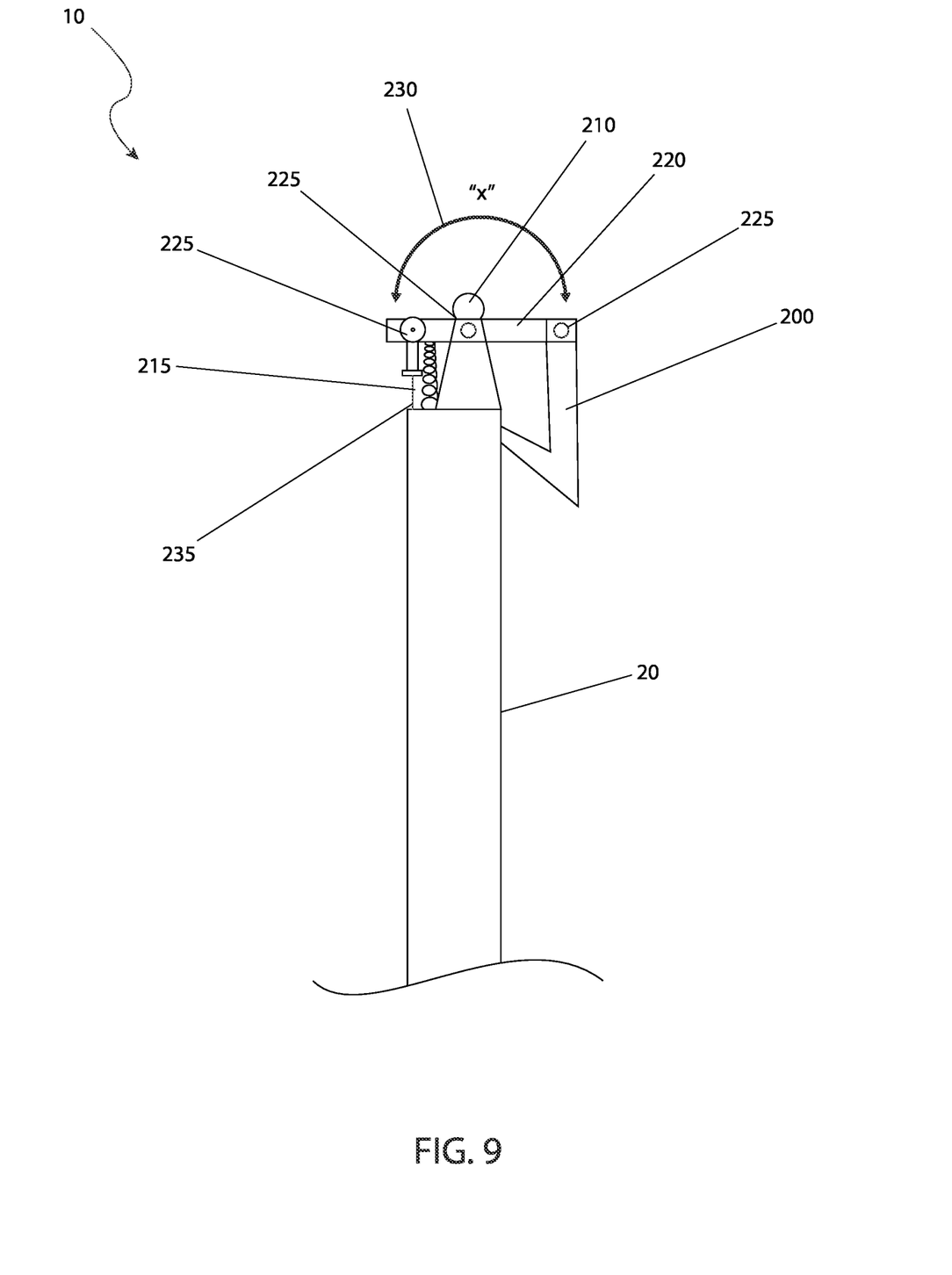
FIG. 9 is a sectional view of the gate release mechanism as seen along a Line II-II, as shown in FIG. 8, according to the preferred embodiment of the present invention.

Referring to FIG. 9, a sectional view of the gate release mechanism 195 as seen along a Line II-II, as shown in FIG. 8, according to the preferred embodiment of the present invention is shown. This view clarifies the relationship between the outer frame 20 and the gate handle 200. The gate handle 200 is mechanically coupled to a pivot arm 220 by a pivot connecting 225. Similar pivot connecting 225 connect the pivot arm 220 to the fixed stanchion 210 as well as the pivot arm 220 to the release pin 215. This relation between the pivot arm 220 and the fixed stanchion 210 results in a reciprocation motion travel path "x" 230 that lifts the release pin 215 when the gate handle 200 is activated. A spring 235 keeps the release pin 215 engaged when the gate handle 200 is not activated thus keeping the outer frame 20 closed.

2. Operation of the Preferred Embodiment

The preferred embodiment of the present invention can be utilized by the common user in a simple and effortless manner with little or no training. It is envisioned that the tailgate 10 would be constructed in general accordance with FIG. 1 through FIG. 9. The user would procure the tailgate 10 from conventional procurement channels such as automotive dealerships, truck accessory stores, farm supply stores, mail order and internet supply houses and the like. Special attention would be paid to the specific make and model of the pickup truck 15 upon which the tailgate 10 is to be installed, as well as the desired options of the inner frame 70, the toolbox 120, and/or the loading ramps 160 to be used with the tailgate 10.

After procurement and prior to utilization, the tailgate 10 would be prepared in the following manner: the original equipment manufacturer (OEM) tailgate is removed following manufacturer's instructions; the removable pin hinges 40 of the outer frame 20 is then connected; the support cables 65 are attached on either side of the outer frame 20; and the outer frame 20 stowed in an upright position with the use of the release knobs 50 and the locking mechanism 105. Usage of the outer frame 20 may occur by itself in an effort to save weight and improve fuel efficiency.

Depending on the usage scenario, the inner frame 70 is installed in the cavity 100 formed by the track channels 85 and the outer frame 20. Installation of the inner frame 70 allows for the enhanced overall bed length "e" 95 as well as a higher tailgate height for transport of large items with the outer frame 20 in an upright position. The toolbox 120 may be installed in the cavity 100 formed by the track channels 85 and the outer frame 20 to allow for transport of smaller tools and supplies. Finally, the loading ramps 160 may be installed in the cavity 100 formed by the track channels 85 and the outer frame 20 for loading and unloading of larger wheeled vehicles and equipment.

The use of the tailgate 10 provides the following benefits when compared to a conventional OEM tailgate: provides the ability to haul longer loads safely and easily, the ability to haul taller loads safely, easy access to tools at end of truck bed area 165; provides less breakage of long construction materials hauled; and enables easier parking of the pickup truck 15 in more locations as the use of a trailer is no longer required due to the hauling capabilities of the tailgate 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A pickup truck tailgate, comprising:
    an outer frame positioned in an area adapted to be occupied by a conventional tailgate of a pick-up truck, the outer frame is formed by a pair of outer horizontal members and a plurality of outer vertical members;
    an interior field having a plurality of grating;
    an inner frame having a pair of inner horizontal members and a plurality of inner vertical members, the inner frame is positioned atop the outer frame and rides inside of a pair of track channels and moves along a sliding travel path;
    a locking mechanism disposed on an interior of the outer vertical members, the locking mechanism secures the tailgate to a locking pin clasp; and
    a gate release mechanism having a gate handle adapted to be operated by a user while opening the outer frame, the gate handle is anchored between a moving end point pivot and indirectly to a fixed stanchion, that allows the gate handle to move.

2. The pickup truck tailgate, according to claim 1, wherein the outer frame is adapted to be attached to the pickup truck with a plurality of removable pin hinges in each lower corner of the outer frame and a plurality of locking pin clasps in each upper corner of the outer frame.

3. The pickup truck tailgate, according to claim 2, wherein the locking pin clasps are opened on each side of the outer frame by a plurality of corresponding release knobs.

4. The pickup truck tailgate, according to claim 3, wherein each of the corresponding release knobs include a spring to allow for automatic locking when the tailgate is lifted up and closed.

5. The pickup truck tailgate, according to claim 1, wherein the outer frame pivots on a removable pin hinge, allowing the tailgate to be removed.

6. The pickup truck tailgate, according to claim 1, wherein the outer frame in an opened position is supported on a pair of support cables from each upper and outward corner of the outer frame.

7. The pickup truck tailgate, according to claim 6, wherein the support cables attach to the outer vertical members by a flanged pin and a ring connector.

8. The pickup truck tailgate, according to claim 1, wherein the outer horizontal members of the outer frame are in physical communication with the outer vertical members and the track channels are in physical communication with the outer vertical members.

9. The pickup truck tailgate, according to claim 1, wherein the grating allows a plurality of air to flow through the tailgate when traveling at highway speeds resulting in higher gas mileage.

10. The pickup truck tailgate, according to claim 1, wherein the inner frame provides for an enhanced overall bed length for transportation of one or more items.

11. The pickup truck tailgate, according to claim 10, wherein the inner horizontal members and the inner vertical members of the inner frame are free to move in a cavity formed by the track channels and the outer horizontal members.

12. The pickup truck tailgate, according to claim 1, further comprising a pair of loading ramps stored in the cavity of the outer frame in a horizontal manner.

13. The pickup truck tailgate, according to claim 12, wherein each of the loading ramps include a pair of main members with a plurality of cross members, an attachment plate, and a hinge.

14. The pickup truck tailgate, according to claim 12, wherein an attachment plate are positioned along the outer horizontal members of the outer frame while a hinge adjusts for a plurality of grades and a plurality of grade angles the pickup truck is parked upon.

15. The pickup truck tailgate, according to claim 1, further comprising a toolbox adapted to be installed on the tailgate installed in place of the inner frame.

16. The pickup truck tailgate, according to claim 15, wherein the toolbox transitions from a horizontal position when the outer frame is in a lowered or opened state to a vertical position when the outer frame is in a raised or closed state.

17. The pickup truck tailgate, according to claim 15, wherein an interior of the toolbox includes a plurality of tie-down straps to aid in securing a plurality of tools and supplies.

18. The pickup truck tailgate, according to claim 1, wherein once moved, the fixed stanchion operates a release pin that secures the outer frame to the pickup truck.

19. The pickup truck tailgate, according to claim 18, wherein the release pin is in a down position, the outer frame is secured in upright vertical position and the release pin is in an up position, the outer frame is placed in an open horizontal position.

20. The pickup truck tailgate, according to claim 1, wherein the gate handle is mechanically coupled to a pivot arm by a pivot connecting that connect the pivot arm to the fixed stanchion as well as the pivot arm to release pin.

\* \* \* \* \*